(12) United States Patent
Ohzawa et al.

(10) Patent No.: US 10,382,642 B2
(45) Date of Patent: Aug. 13, 2019

(54) IMAGE READING APPARATUS

(71) Applicant: KONICA MINOLTA, INC., Chiyoda-ku, Tokyo (JP)

(72) Inventors: Satoko Ohzawa, Toyokawa (JP); Akira Yamamura, Toyokawa (JP); Shogo Asaoka, Toyokawa (JP); Yuki Higuchi, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/901,406

(22) Filed: Feb. 21, 2018

(65) Prior Publication Data

US 2018/0262638 A1 Sep. 13, 2018

(30) Foreign Application Priority Data

Mar. 13, 2017 (JP) .................. 2017-047416

(51) Int. Cl.
| H04N 1/00 | (2006.01) |
| H04N 1/03 | (2006.01) |
| H04N 1/031 | (2006.01) |
| H04N 1/028 | (2006.01) |

(52) U.S. Cl.
CPC ....... *H04N 1/0305* (2013.01); *H04N 1/02825* (2013.01); *H04N 1/0306* (2013.01); *H04N 1/0315* (2013.01); *H04N 1/0318* (2013.01)

(58) Field of Classification Search
CPC .. H04N 1/0305; H04N 1/0318; H04N 1/0315; H04N 1/02825; H04N 1/0306
See application file for complete search history.

(56) References Cited

U.S. PATENT DOCUMENTS

| 7,884,976 B2 | 2/2011 | Minobe et al. |
| 8,107,138 B2 | 1/2012 | Minobe et al. |

FOREIGN PATENT DOCUMENTS

| JP | 2009141681 A | 6/2009 |
| JP | 2009273000 A | 11/2009 |

*Primary Examiner* — Eric A. Rust
(74) *Attorney, Agent, or Firm* — Holtz, Holtz & Volek PC

(57) ABSTRACT

An image reading apparatus includes a light source, a light receiving unit, and an optical system. The light receiving unit includes a plurality of light receiving elements. The optical system includes a plurality of optical components for splitting the light reflected from the object to be read, and guiding the split light to each of the plurality of light receiving elements. The plurality of optical components include a splitting component that splits the light reflected from the object to be read in a direction corresponding to a main direction, and a common component provided with a common portion. The common portion has an optically acting area causing a common effect on the tight split by the splitting component. A cross sectional shape of the optically acting area orthogonal to a direction corresponding to the main direction is the same shape along the direction corresponding to the main direction.

16 Claims, 11 Drawing Sheets

IMAGE READING APPARATUS

The entire disclosure of Japanese Patent Application No. 2017-047416, filed on Mar. 13, 2017, is incorporated herein by reference in its entirety.

BACKGROUND

Technological Field

The present invention relates to an image reading apparatus.

Description of the Related Art

Conventionally, there are mainly two types of scanners that read an original by a line sensor, i.e., a CCD type (a reducing optical system) and a CIS type (an equi-magnifying optical system). The reducing optical system has a deep focal depth but is difficult to miniaturize, whereas the equi-magnifying optical system can be miniaturized but has a shallow focal depth.

For this reason, the CCD type is a mainstream for a flat bed scanner, whereas the CIS type is often used for reading through an ADF transporting an original. In order to eliminate image quality difference between the front and back sides of an original (i.e., between the flat bed and the ADF), a reading module is required which is capable of the same level of miniaturization as the CIS type and has the same level of focal depth as the CCD type.

As a method therefor, for example, Japanese Laid-Open Patent Publication No. 2009-141681 discloses a method using a splitting optical system in which an optical path is divided in a main direction and an image is formed on a light receiving element by lenses arrayed in the main direction. In this method, a substantially telecentric optical system is used on the side of an image to implement a miniaturized unit having a large depth.

However, if in such a splitting optical system an equi-magnifying optical system is used to reduce error sensitivity on the side of the light receiving element, a ray of light would enter adjacent optical paths, resulting in an image overlapping at a boundary of a split portion.

In order to solve this problem, Japanese Laid-Open Patent Publication No. 2009-273000 describes that sensors are disposed in two rows in a staggering manner and a first plane mirror is used to split an optical path in rightward and leftward, two directions to provide two types of optical paths which are used in a main direction alternately to eliminate image overlap.

SUMMARY

However, the image reading apparatus disclosed in Japanese Laid-Open Patent Publication No. 2009-273000 requires a reflecting mirror, a lens mirror, and a sensor substrate for each split optical path. This results in an increased number of optical components. As the number of components increases, there are many parts where errors and variations occur. This makes adjustment of the optical components complicated and invites degraded imaging performance.

The present invention has been made in view of the above problems, and an object of the present invention is to provide an image reading apparatus having a minimized number of optical components and also capable of improving imaging performance.

To achieve at least one of the abovementioned objects, according to an aspect of the present invention, an image reading apparatus reflecting one aspect of the present invention comprises: a light source that emits light in a main direction toward an object to be read; a light receiving unit that receives light reflected from the object to be read; and an optical system that allows the light receiving unit to receive the light reflected from the object to be read. The light receiving unit includes a plurality of light receiving elements disposed such that a plurality thereof are aligned with a plurality thereof along a direction corresponding to the main direction and a plurality thereof are aligned with a plurality thereof along a direction corresponding to a sub direction orthogonal to the main direction. The optical system includes a plurality of optical components for guiding the light reflected from the object to be read to each of the plurality of light receiving elements. The plurality of optical components include a splitting component that splits the light reflected from the object to be read in a direction corresponding to the main direction, and a common component provided with a common portion disposed downstream of the splitting component on an optical path on which the light reflected from the object to be read travels toward the light receiving unit. The common portion has an optically acting area causing a common effect on each of light split by the splitting component, and a cross sectional shape of the optically acting area orthogonal to a direction corresponding to the main direction is the same shape along the direction corresponding to the main direction.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present will be described with reference to the drawings. However, the scope of the invention is not limited to the disclosed embodiments. In the following embodiments, identical or common components are identically denoted in the figures and will not be described redundantly.

First Embodiment

Figure 1:
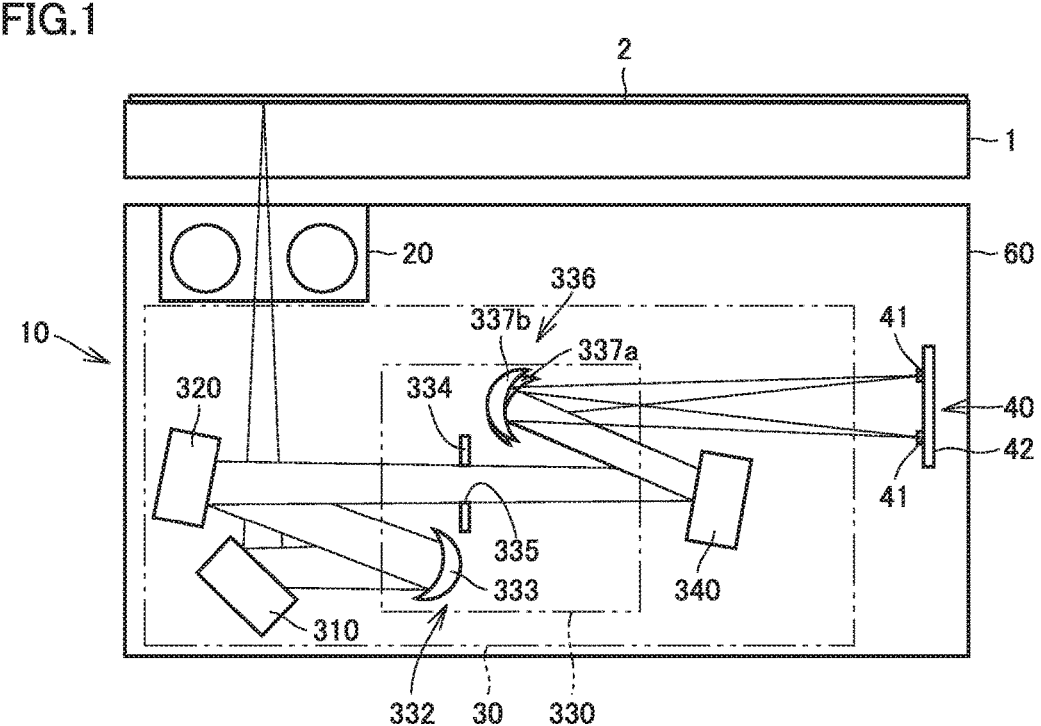
FIG. 1 is a schematic cross-sectional view of an image reading apparatus according to a first embodiment.
Figure 2:
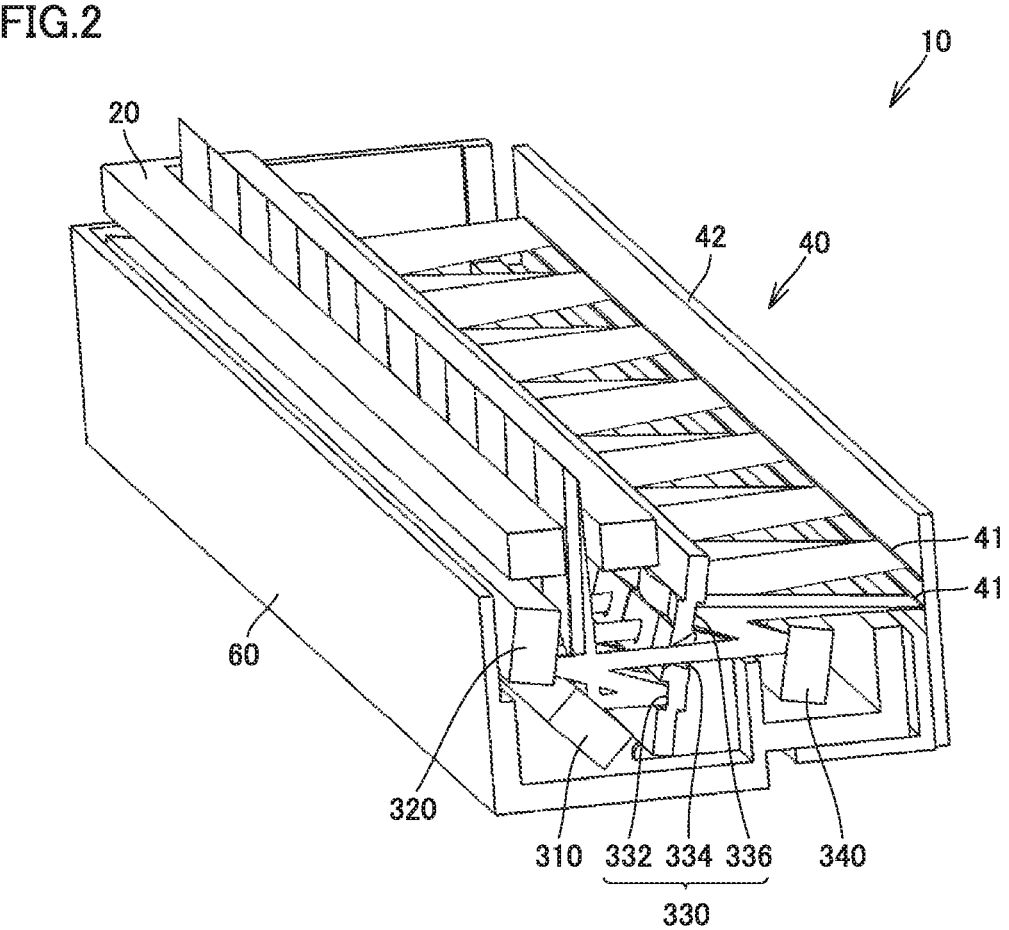
FIG. 2 is a schematic perspective view the image reading apparatus according to the first embodiment.

FIG. 1 is a schematic cross-sectional view of an image reading apparatus according to a first embodiment. FIG. 2 is a schematic perspective view of the image reading apparatus according to the first embodiment. With reference to FIG. 1 and FIG. 2, an image reading apparatus 10 according to the first embodiment will be described.

As shown in FIGS. 1 and 2, image reading apparatus 10 emits light from a light source 20 to an original 2 serving as an object placed on a platen glass 1 to be read and photoelectrically converts the light that is reflected from the original by a light receiving unit 40 to read image. Image reading apparatus 10 includes light source 20, an optical system 30, light receiving unit 40, and a housing 60. Housing 60 houses light source 20, optical system 30, and light receiving unit 40 therein.

Light source 20 emits light to expose the object to be read therewith in a main direction (a direction perpendicular to the plane of the sheet of FIG. 1). Light source 20 can for example be an illumination unit using an LED or the like.

Light receiving unit 40 receives light reflected from original 2. Light receiving unit 40 photoelectrically converts the received light. Light receiving unit 40 includes a plurality of light receiving elements 41 disposed such that a plurality thereof are aligned with a plurality thereof along a direction corresponding to the main direction and a plurality thereof are aligned with a plurality thereof along a direction corresponding to a sub direction orthogonal to the main direction.

The plurality of light receiving elements 41 are disposed in the sub direction in two rows in a staggering manner. Specifically, the plurality of light receiving elements 41 are disposed in two rows in a direction corresponding to the sub direction, and light receiving elements 41 disposed in the first row in the direction corresponding to the sub direction and light receiving elements 41 disposed in the second row in the direction corresponding to the sub direction are alternately disposed in the direction corresponding to the main direction.

The plurality of light receiving elements 41 are flush with one another. The plurality of light receiving elements 41 are mounted on a circuit board 42. The plurality of light receiving elements 41 are located on the same side with respect to original 2. The plurality of light receiving elements 41 are located below original 2.

Light receiving element 41 can be an image pickup element such as a semiconductor sensor. Circuit board 42 is provided with a signal processing circuit and the like for processing a photoelectrically converted signal.

Optical system 30 is provided for allowing the light receiving unit to receive the light reflected from original 2. Optical system 30 includes a plurality of optical components for guiding light that is reflected from original 2 to each of the plurality of light receiving elements 41.

The plurality of optical components include a plurality of reflecting mirrors 310, 320 and 340, and an optical element 330. The plurality of reflecting mirrors 310, 320 and 340 extend in a direction corresponding to the main direction. The plurality of reflecting mirrors 310, 320 and 340 can for example be planar reflecting mirror.

Optical element 330 includes a first leas mirror array 332, a diaphragm 334, and a second lens mirror array 336. First lens mirror array 332, diaphragm 334, and second lens mirror array 336 are integrated together. First lens mirror array 332, diaphragm 334, and second lens mirror array 336 are injection-mold in one piece for example.

Reflecting mirrors 310, 320 and 340, and optical element 330 are disposed as follows: on an optical path on which the light reflected from original 2 travels toward light receiving unit 40, reflecting mirror 310 is disposed followed by first lens mirror array 332 followed by reflecting mirror 320 followed by diaphragm 334 followed by reflecting mirror 340 followed by second lens mirror array 336.

Figure 3:
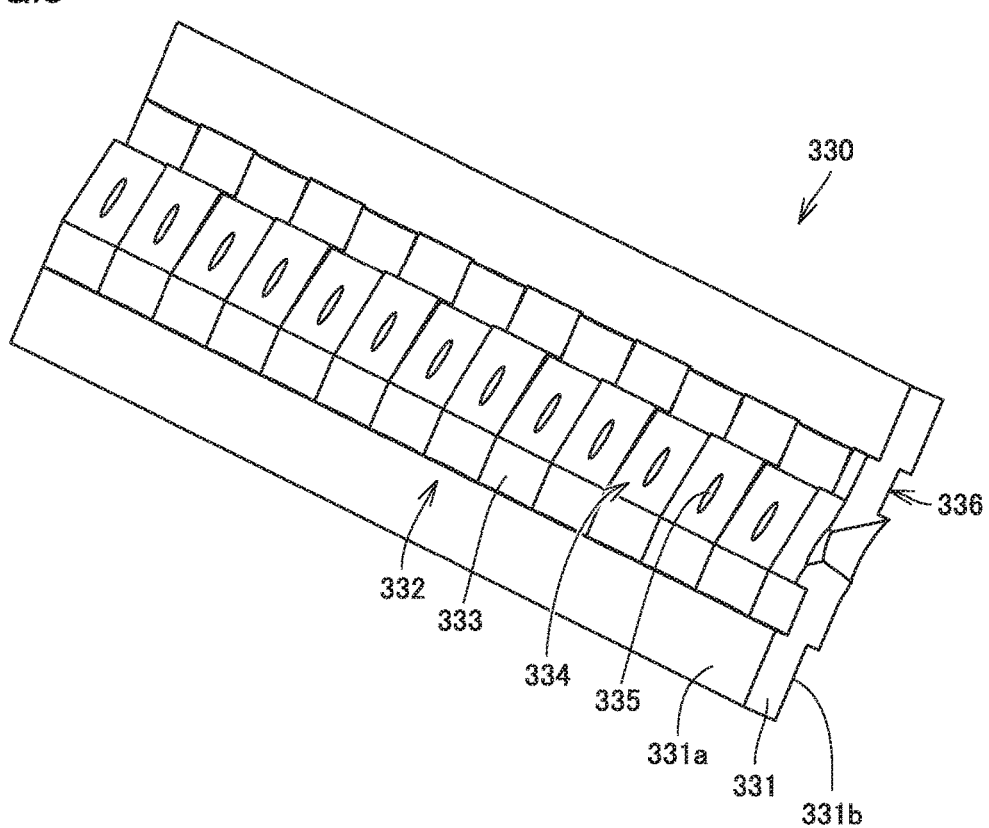
FIG. 3 is a perspective view showing a first surface side of an optical element included in the image reading apparatus according to the first embodiment.
Figure 4:
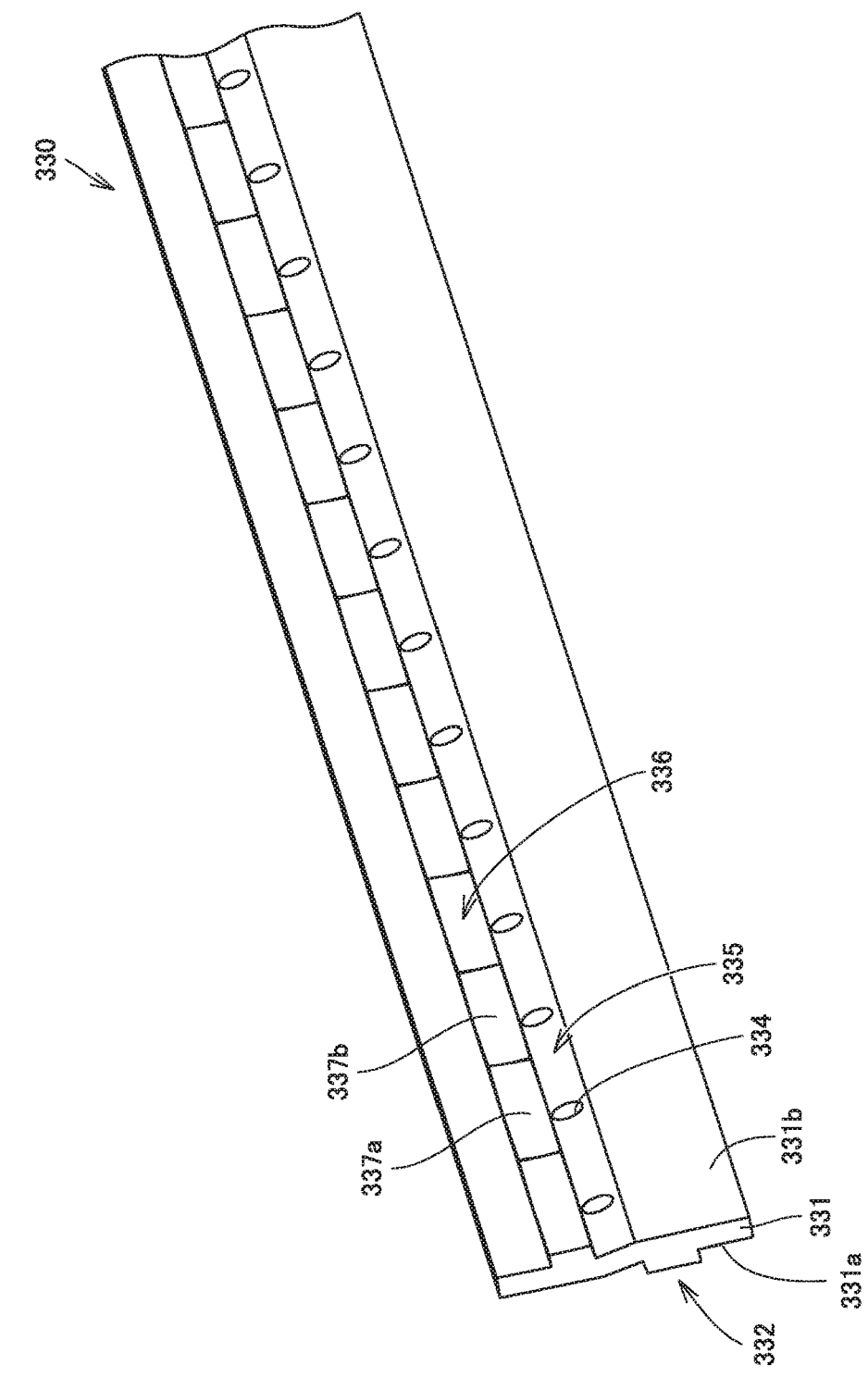
FIG. 4 is a perspective view showing a second surface side of the optical element included in the image reading apparatus according to the first embodiment.

FIG. 3 is a perspective view showing a first surface side of the optical element included in the image reading apparatus according to the first embodiment. FIG. 4 is a perspective view showing a second surface side of the optical element included in the image reading apparatus according to the first embodiment.

As shown in FIGS. 3 and 4, optical element 330 includes a substrate 331 having a first surface 331a and a second surface 331b opposite to each other. First lens mirror array 332 is provided on the first surface 3311a side, and second lens mirror array 336 is provided on the second surface 331b side.

First lens mirror array 332 and second lens mirror array 336 are aligned in a direction corresponding to the sub direction. Specifically, first lens mirror array 332 and second lens mirror array 336 are aligned in an upward and downward direction. First lens mirror array 332 is located below second lens mirror array 336.

First lens mirror array 332 has a plurality of lens mirror portions 333 aligned along a direction corresponding to the main direction. The plurality of lens mirror portions 333 each have a substantially identical curved reflecting surface. The plurality of lens mirror portions 333 are integrated together.

The plurality of lens mirror portions 333 are sectioned in accordance with the number of light receiving elements 41 aligned along the main direction. The plurality or lens mirror portions 333 reflect incident light while reducing it. Light incident on first lens mirror array 332 is thus split along a direction corresponding to the man direction. Thus first lens mirror array 332 corresponds to a splitting component splitting the light reflected from original 2 in a direction corresponding to the main direction.

Diaphragm 334 is disposed between first lens mirror array 332 and second lens mirror array 336 in a direction in which first lens mirror array 332 and second lens mirror array 336 are aligned.

Diaphragm 334 has a plurality of apertures 335. The plurality of apertures 335 are aligned along a direction corresponding to the main direction. The plurality of apertures 335 are provided in accordance with the number of lens mirror portions 333. The plurality of apertures 335 narrow light passing therethrough. The plurality of apertures 335 each narrow light in both a direction corresponding to the main direction and a direction corresponding to the sub direction.

Second lens mirror array 336 includes a plurality of lens mirror portions 337a, 337b aligned along a direction corresponding to the main direction. A plurality of lens mirror portions 337a and a plurality of lens mirror portions 337b are disposed side by side alternately along a direction corresponding to the main direction.

An elevation angle of a curved reflecting surface of lens mirror portion 337a differs from an elevation angle of a curved reflecting surface of lens mirror portion 337b in a direction corresponding to the sub direction. As a result, light incident on second lens mirror array 336 is distributed in a direction corresponding to the sub direction.

The elevation angles of the curved reflecting surfaces that lens mirror portions 337a and 337b have can be set as appropriate. When the elevation angles have a reduced angular difference, an offset of light distributed in a direction corresponding to the sub direction can be reduced. This allows circuit board 42 to have a reduced size and a plurality of light receiving elements 41 to be disposed on a single circuit board 42.

As shown in FIGS. 1 and 2, reflecting mirror 310 is disposed upstream of first lens mirror array 332 on the optical path on which the light reflected from original 2 travels toward light receiving unit 40. Reflecting mirror 310 corresponds to an upstream reflecting mirror. Reflecting mirror 310 reflects toward first lens mirror array 332 the light reflected from original 2.

The plurality of lens mirror portions 333 included in first lens mirror array 332 each have a reflecting surface facing a side on which reflecting mirror 320 is located. More specifically, it faces the reflecting surface of reflecting mirror 310 and the reflecting surface of reflecting mirror 320.

First lens mirror array 332 functions as a splitting component, and splits incident light along a direction corresponding to the main direction and reflects the light toward reflecting mirror 320.

Reflecting mirror 320 is disposed to follow first lens mirror array 332 along the optical path on which the light reflected from original 2 travels toward light receiving unit 40. Reflecting mirror 320 corresponds to a first downstream reflecting mirror and also corresponds to a first reflecting mirror.

Furthermore, the reflecting surface of reflecting mirror 320 corresponds to a common portion disposed downstream of the first lens mirror array serving as a splitting component on the optical path on which the light reflected from an object to be read travels toward the light receiving unit, and the reflecting surface of reflecting mirror 320 functions as an optically acting area causing a common effect on each of light split by first lens mirror array 332. The reflecting surface of reflecting mirror 320 is formed flat and has the same shape along a direction corresponding to the main direction.

Reflecting mirror 320 reflects each of light split by first lens mirror array 332 toward reflecting mirror 340.

On the optical path on which the light reflected from original 2 travels toward light receiving unit 40, diaphragm 334 is disposed between reflecting mirror 320 and reflecting mirror 340. The light reflected by reflecting mirror 320 passes through aperture 335 provided through diaphragm 334 and is incident on reflecting mirror 340. In doing so, each of light split by first lens mirror array 332 is narrowed by the plurality of apertures 335.

Reflecting mirror 340 reflects the light reflected by reflecting mirror 320 toward second lens mirror array 336. Reflecting mirror 340 corresponds to second reflecting mirror.

Reflecting mirror 340 also has a reflecting surface functioning as a common portion disposed downstream of first lens mirror array 332 serving as a splitting component on the optical path on which the light reflected from original 2 travels toward light receiving unit 40. The reflecting surface of reflecting mirror 340 functions as an optically acting area causing a common effect on each of light split by first lens mirror array 332. The reflecting surface of reflecting mirror 340 is formed flat and has the same shape along a direction corresponding to the main direction.

Second lens mirror array 336 immediately precedes light receiving unit 40 on the optical path on which the light reflected from original 2 travels toward light receiving unit 40. Second lens mirror array 336 functions as a distributing component distributing reflected light in a direction corresponding to the sub direction.

Second lens mirror array 336 has lens mirror portions 337a and 337b having mutually different elevation angles, respectively, with respect to a direction corresponding to the sub direction. Second lens mirror array 336 thus distributes the light reflected from original 2 in a plurality of rows in a direction corresponding to the sub direction.

Specifically, second lens mirror array 336 distributes each of light split by first lens mirror array 332, alternately along a direction corresponding to the main direction, toward a first row and a second row in a direction corresponding to the sub direction. Each of light distributed by second lens mirror array 336 is received by the plurality of light receiving units 40.

Thus image reading apparatus 10 according to the first embodiment has reflecting mirrors 320 and 340 disposed downstream of first lens mirror array 332 splitting light reflected from original 2 in a main direction. Reflecting mirrors 320 and 340 each having a reflecting surface with a cross sectional shape orthogonal to a direction corresponding to the main direction, that has the same shape along the direction corresponding to the main direction, can cause a common optical effect, or reflection, on each of light split by first lens mirror array 332.

When this is compared with providing a plurality of reflecting mirrors so as to correspond to each split light, the former can suppress an increase in the number of optical components composing optical system 30.

Furthermore, as the above-described cross sectional shape of the reflecting surface serving as the optically acting area has the same shape along the direction corresponding to the main direction, disposing reflecting mirrors 320 and 340 across all of spilt light and setting an angle for installation facilitate adjusting an optical component.

When this is compared with providing a plurality of reflecting mirrors so as to correspond to each split light for adjustment, the former can suppress variation in angle for installation and the like and as a result can improve imaging performance.

Thus according to the first embodiment image reading apparatus 10 can provide an image reading apparatus having a minimized number of optical components and also capable of improving imaging performance.

Furthermore, first lens mirror array 332 is configured with a plurality of identically shaped lens mirror portions 333 integrated together. When this configuration of the first embodiment is compared with installing a plurality of lens mirrors independently, the former can facilitate adjusting an optical component such as positioning it, and can also suppress variation in installation and the like.

Further, as the plurality of lens mirror portions 333 are integrated together, when vapor deposition is performed in a production process to form a reflecting surface the reflecting surface of each lens mirror portion 333 can be formed by performing vapor deposition once.

In second lens mirror array 336, two types of lens mirror portions 337a and 337b having different elevation angles are alternately disposed, and they can be disposed substantially at the same level in a vertical direction (an upward and downward direction). This allows the plurality of lens mirror portions 337a, 337b to be integrated together.

When this configuration of the first embodiment is compared with installing a plurality of lens mirrors independently, the former can facilitate adjusting an optical component such as positioning it, and can also suppress variation in installation and the like.

Further, by integrating the plurality of lens mirror portions 337a, 337b together with their elevation angles having a small difference therebetween, when vapor deposition is performed in a production process to form a reflecting surface the reflecting surface of each lens mirror portion 337a, 337b can be formed by performing vapor deposition once.

Furthermore, the small difference between the elevation angles of lens mirror portions 337a and 337b can reduce an offset of light distributed in a direction corresponding to the sub direction. This allows circuit board 42 to have a reduced size and a plurality of light receiving elements 41 to be disposed on a single circuit board 42. As a result, light receiving element 41 can also be easily adjusted.

In addition, since first lens mirror array 332, second lens mirror array 336, and diaphragm 334 are integrated together, an important optical component in the splitting optical system, or first lens mirror array 332, and diaphragm 334, can have a positional relationship determined by precision of optical element 330 as a component and so can second lens mirror array 336 and diaphragm 334. This allows a plurality of image reading apparatuses 10 to be produced while suppressing variation between the apparatuses in assembling them.

Second Embodiment

Figure 5:
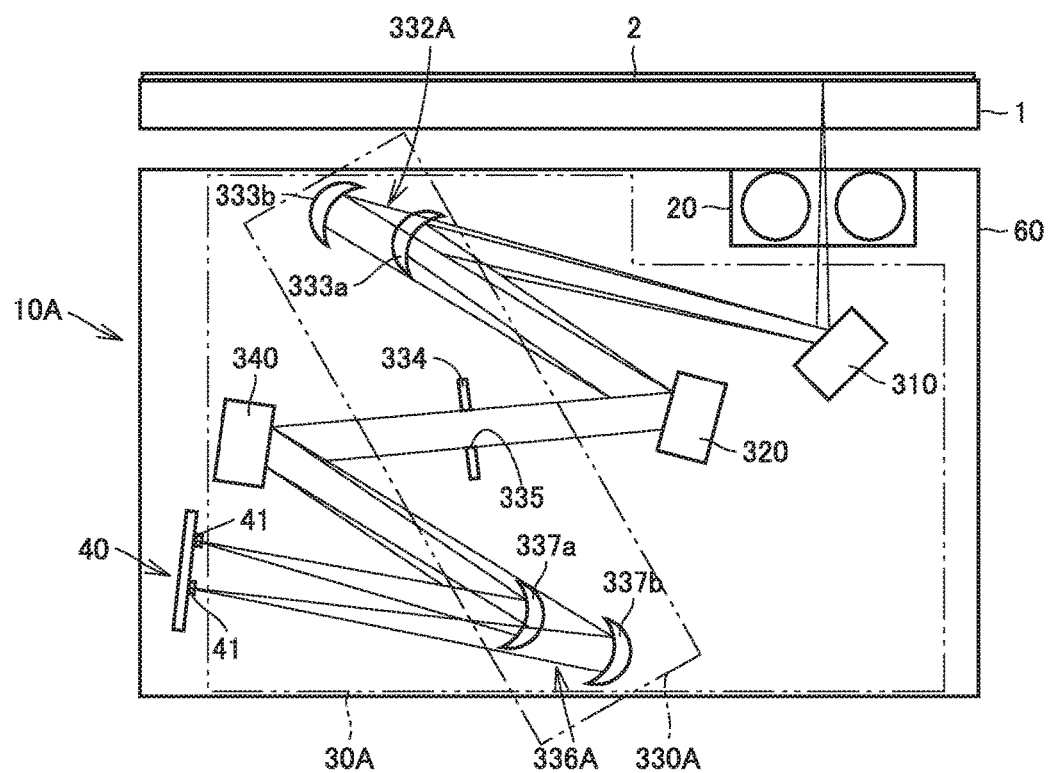
FIG. 5 is a schematic cross-sectional view of an image reading apparatus according to a second embodiment.

FIG. 5 is a schematic cross-sectional view of an image reading apparatus according to a second embodiment. With reference to FIG. 5, an image reading apparatus 10A according to the second embodiment will be described.

As shown in FIG. 5, image reading apparatus 10A according to the second embodiment is different front image reading apparatus 10 according to the first embodiment in how an optical system 30A is configured. The remainder in configuration is substantially the same.

Optical system 30A is configured such that light reflected from original 2 is distributed in a plurality of rows in a direction corresponding to the sub direction and the plurality of distributed rows of light have mutually different optical path lengths. When optical system 30A is compared with optical system 30 according to the first embodiment, the former is different front the latter in how an optical element 330A is configured. The remainder in configuration is substantially the same.

Figure 6:
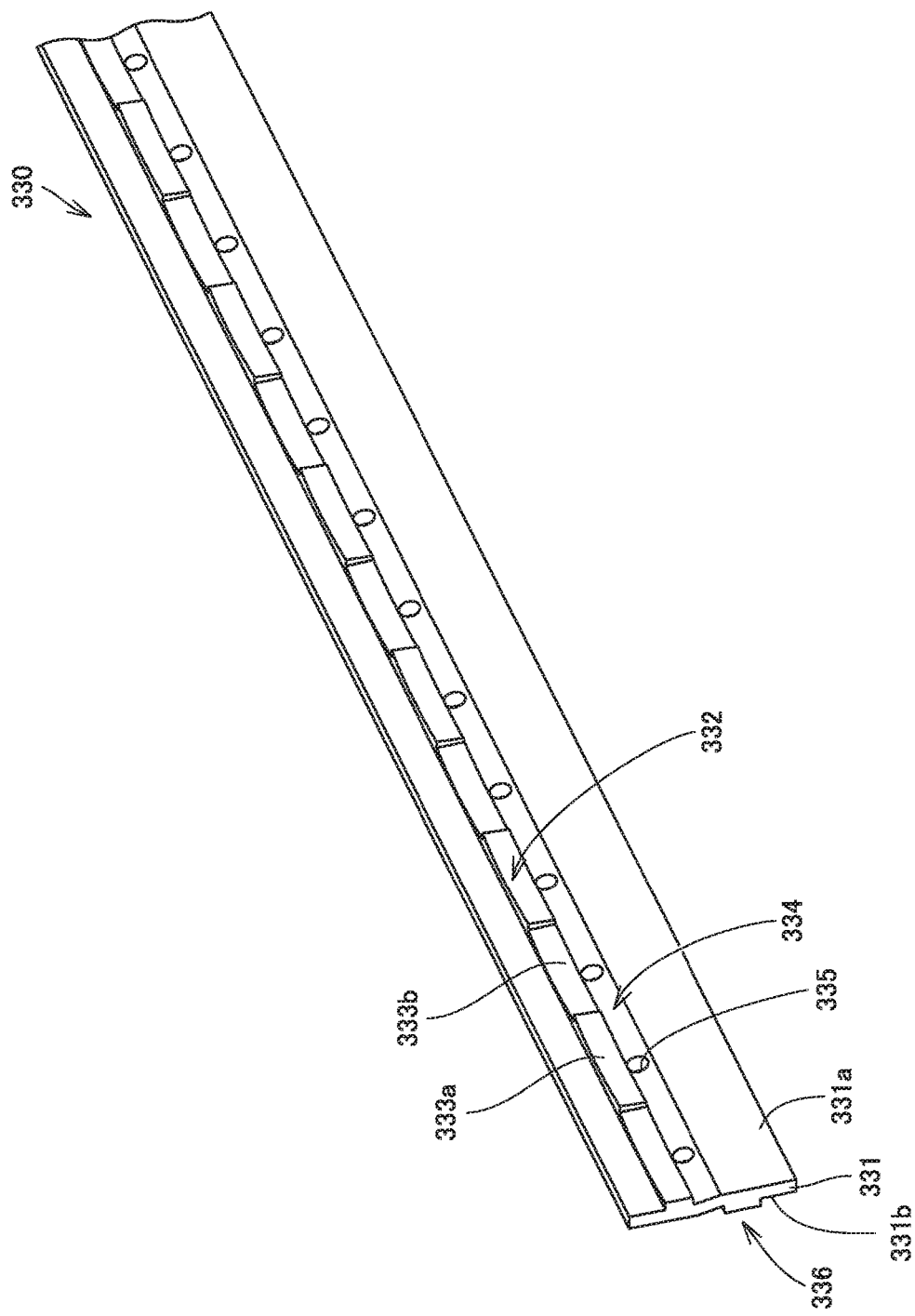
FIG. 6 is a perspective view showing a first surface side of an optical element included in the image reading apparatus according to the second embodiment.

FIG. 6 is a perspective view showing one side of an optical element included in the image reading apparatus according to the second embodiment. With reference to FIG. 6, optical element 330A included in image reading apparatus 10A according to the second embodiment will be described.

Optical element 330A has a first lens mirror array 332A, diaphragm 334, and a second lens mirror array 336A. First lens mirror array 332A, diaphragm 334, and second lens mirror array 336A are integrated together.

In optical element 330A, first lens mirror array 332A is located above second lens mirror array 336A.

First lens mirror array 332A has a plurality of lens mirror portions 333a, 333b aligned along a direction corresponding to the main direction. The plurality of lens mirror portions 333a, 333b are sectioned in accordance with the number of light receiving elements 41 aligned along the main direction. The plurality of lens mirror portions 333a, 333b reflect incident light while reducing it. Light incident on first lens mirror array 332A is thus split along a direction corresponding to the main direction.

The plurality of lens mirror portions 333a, 333b are disposed side by side alternately along a direction corresponding to the main direction. The plurality of lens mirror portions 333a and 333b are disposed forward and backward with respect to a direction in which light proceeds on the optical path on which the light reflected from original 2 travels toward light receiving unit 40.

This causes an optical path difference between light incident on a plurality of lens mirror portions 333a and light incident on a plurality of lens mirror portions 333b, and as a result, first lens mirror array 332A distributes the light reflected from original 2 in a plurality of rows in a direction corresponding to the sub direction.

Thus first lens mirror array 332A functions as a splitting component splitting the light reflected from original 2 in a direction corresponding to the main direction, and also functions as a light distributing component distributing the light reflected from original 2 in a direction corresponding to the sub direction.

Diaphragm 334 is disposed between first lens mirror array 332A and second lens mirror array 336A on the optical path on which the light reflected from original 2 travels toward light receiving unit 40.

Diaphragm 334 has a plurality of apertures 335. The plurality of apertures 335 are aligned along a direction corresponding to the main direction. The plurality of apertures 335 are provided in accordance with the limber of lens mirror portions 333a and 333b. The plurality of apertures 335 narrow light passing therethrough. The plurality of apertures 335 each narrow light in both a direction corresponding to the main direction and a direction corresponding to the sub direction.

Second lens mirror array 336A also has substantially the same configuration as first lens mirror array 332A. Second tens mirror array 336A has a plurality of lens mirror portions 337a, 337b aligned along a direction corresponding to the main direction.

The plurality of lens mirror portions 337a, 337b are disposed side by side alternately along a direction corresponding to the main direction. The plurality of lens mirror portions 337a, 337b are disposed forward and backward with respect to a direction in which light proceeds on the optical path on which the light reflected front original 2 travels toward light receiving unit 40.

Each of a plurality of lens mirror portions 337a is provided so as to correspond to each of the plurality of lens mirror portions 333a of first lens mirror array 332A. Each of a plurality of lens mirror portions 337b is provided so as to correspond to each of the plurality of lens mirror portions 333b of first lens mirror array 332A.

With reference to FIG. 5, in optical system 30A, the light reflected from original 2 is reflected by reflecting mirror 310 toward first lens mirror array 332A. First lens mirror array 332A splits the light in a direction corresponding to the main direction and also distributes the light in a direction corresponding to the sub direction, and each such light is reflected by the reflecting surface of the reflecting mirror 320 toward reflecting mirror 340.

Note that the light reflected by lens mirror portion 333a of first lens mirror array 332A and the light reflected by the lens mirror portion 333b of first lens mirror array 332A have different optical path lengths, and accordingly, they are reflected by reflecting mirror 320 at different positions.

In this case also, reflecting mirror 320 having a reflecting surface with a cross sectional shape orthogonal to a direction corresponding to the main direction, that has the same shape along the direction corresponding to the main direction across each of light split in the direction corresponding to the main direction, can cause a common optical effect, or reflection, on each of light split by first lens mirror array 332A in a direction corresponding to the main direction and distributed by first lens mirror array 332A in a direction corresponding to the sub direction.

The light incident on reflecting mirror 340 is reflected by reflecting mirror 340 toward second lens mirror array 336A. Reflecting mirror 340, as well as reflecting mirror 320, having the same shape along a direction corresponding to the main direction can cause a common optical effect, or reflection, on each of light split by first lens mirror array 332A in a direction corresponding to the main direction and distributed by first lens mirror array 332A in a direction corresponding to the sub direction.

The light reflected by reflecting mirror 340 is introduced to each of light receiving elements 41 by second lens mirror array 336A.

Each of the plurality of lens mirror portions 337a of second lens mirror array 336A reflects the light reflected by each of the plurality of lens mirror portions 333a while reducing the light in diameter, and thus introduces the light to a plurality of light receiving elements 41 disposed in the first row.

Each of the plurality of lens mirror portions 337b of second lens mirror array 336A reflects the light reflected by each of the plurality of lens mirror portions 333b while reducing the light in diameter, and thus introduces the light to a plurality of light receiving elements 41 disposed in the second row.

In a case thus configured also, the above-described cross sectional shape of the reflecting surface of each reflecting mirror 3201, 340 disposed downstream of first lens mirror array 332A functioning as a splitting component, that has the same shape along a direction corresponding to the main direction, can cause a common optical effect, or reflection, on each of light split by first lens mirror array 332A.

Thus image reading apparatus 10A according to the second embodiment can also provide an effect substantially equivalent to that of image reading apparatus 10 of the first embodiment.

In addition, in image reading apparatus 10A according to the second embodiment, optical system 30A is configured such that light reflected from original 2 is distributed in a plurality of rows in a direction corresponding to the sub direction and the plurality of distributed rows of tight have mutually different optical path lengths. Thus, each split light can be parallel to one another. A plurality of distributed rows alight can thus be perpendicularly incident on light receiving elements 41 disposed in the first row in a direction corresponding to the sub direction and light receiving elements 41 disposed in the second row in the same direction.

This can eliminate the necessity of considering incidence on light receiving element 41. Furthermore, each split light is parallel to one another, and even when light receiving elements 41 are moved in a direction perpendicular to an incident direction, a distance between two split lights will not change, either.

Third Embodiment

Figure 7:
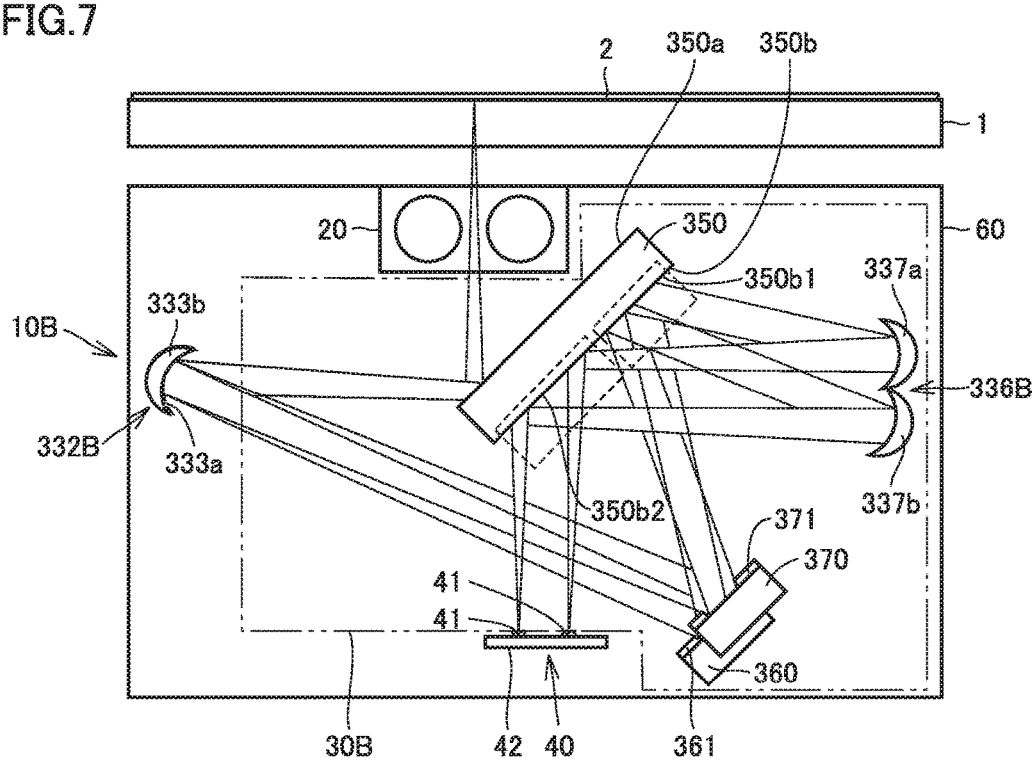
FIG. 7 is a schematic cross-sectional view of an image reading apparatus according to a third embodiment.

FIG. 7 is a schematic cross-sectional view of an image reading apparatus according to a third embodiment. With reference to FIG. 7, an image reading apparatus 10B according to the third embodiment will be described.

As shown in FIG. 7, image reading apparatus 10B according to the third embodiment is different from image reading apparatus 10 according to the first embodiment in how an optical system 30B is configured. The remainder in configuration is substantially the same.

Optical system 30B includes reflecting mirrors 350, 360, 370, a lens mirror array 332B, and a lens mirror array 336B.

Reflecting mirror 350 corresponds to a common reflecting mirror. Reflecting mirror 350 has an upstream reflecting surface 350a and a downstream reflecting surface 350b opposite to each other. Upstream reflecting surface 350a is located upstream of lens mirror array 332B serving as a splitting component on the optical path on which the light reflected from original 2 travels toward light receiving unit 40. Downstream reflecting surface 350b is located on the optical path downstream of lens mirror array 332B.

Lens mirror array 332B includes a plurality of lens mirror portions 333a, 333b aligned along a direction corresponding to the main direction. A plurality of lens mirror portions 333a and a plurality of lens mirror portions 333b are disposed side by side alternately along a direction corresponding to the main direction. The plurality of lens mirror portions 333a, 333b are sectioned in accordance with the number of light receiving elements 41 aligned along the main direction. The plurality of lens mirror portions 333a, 333b reflect incident light while reducing it. Light incident on lens mirror array 332B is thus split along a direction corresponding to the main direction.

An elevation angle of a curved reflecting surface of lens mirror portion 333a differs from an elevation angle of a curved reflecting surface of lens mirror portion 333b in a direction corresponding to the sub direction. As a result, light incident on lens mirror array 332B is distributed in a direction corresponding to the sub direction.

Thus lens mirror array 332B functions as a splitting component splitting the light reflected from original 2 in a direction corresponding to the main direction, and also functions as a light distributing component distributing the light reflected from original 2 in a direction corresponding to the sub direction.

The plurality of lens mirror portions 333a and 333b each have a curved reflecting surface facing reflecting mirrors 360, 370 disposed to follow lens mirror array 332B on the optical path on which the light reflected from original 2 travels toward light receiving unit 40.

Reflecting mirror 360 narrows tight split by lens mirror array 332B. Reflecting mirror 360 is provided with a shielding portion 361 having an opening for example. Shielding portion 361 may be a sealed light shielding member. Reflecting mirror 360 may be a light absorbing member having a reflecting surface formed only on a necessary region thereof.

Reflecting mirror 370 narrows light split by lens mirror array 332B. Reflecting mirror 370 is provided with a shielding portion 371 having an opening for example. Shielding portion 371 may be a sealed light shielding member. Reflecting mirror 370 may be a light absorbing member having a reflecting surface formed only on a necessary region thereof.

Reflecting mirror 350 has downstream reflecting surface 350b formed flat. Downstream reflecting surface 350b has a cross sectional shape orthogonal to a direction corresponding to the main direction, that has the same shape alone a direction corresponding to the main direction. Downstream reflecting surface 350b functions as an optically acting area causing a common effect on each of light split by lens mirror array 332B.

Reflecting mirror 350 has a first acting area 350b1 and a second acting area 350b2. First acting area 350b1 and second acting area 350b2 are provided on downstream reflecting surface 350b. First acting area 350b1 and second acting area 350b2 are disposed sequentially on the optical path on which the light reflected from original 2 travels toward light receiving unit 40. First acting area 350b1 is located upstream of second acting area 350b2 on the optical path. First acting area 350b1 and second acting area 350b2 are a portion of downstream reflecting surface 350b, and function as an optically acting area.

Lens mirror array 336B includes a plurality of lens mirror portions 337a, 337b aligned along a direction corresponding to the main direction. The plurality of lens mirror portions 337a, 337b are aligned in two rows in a direction corresponding to the sub direction. A plurality of lens mirror portions 337a are disposed in the first row in the direction corresponding to the sub direction. A plurality of lens mirror portions 337b are disposed in the second row in the direction corresponding to the sub direction. The plurality of lens mirror portions 333a, 333b reflect incident light while reducing it.

In optical system 30B according to the third embodiment, the light reflected from original 2 is reflected by upstream reflecting surface 350a toward lens mirror array 332B. The light reflected from original 2 is split by lens mirror array 332B in a direction corresponding to the main direction and is also distributed by lens mirror array 332B in a direction corresponding to the sub direction.

Specifically, a portion of the light reflected from original 2 is reflected by the plurality of lens mirror portions 333a toward reflecting mirror 360. Another portion of the light reflected from original 2 is reflected by the plurality of lens mirror portions 333b toward reflecting mirror 370.

The light incident on reflecting mirror 360 is narrowed by shielding portion 361 and thus reflected toward the first acting area 350b1 of downstream reflecting surface 350b. The light incident on reflecting mirror 370 is narrowed by shielding portion 371 and thus reflected toward the first acting area 350b1 of downstream reflecting surface 350b.

First acting area 350b1 is provided so as to traverse each of light split by lens mirror array 332B and reflected from reflecting mirrors 360 and 370. Thus, first acting area 350b1 reflects the light reflected from reflecting mirrors 360 and 370 toward lens mirror array 336B.

Specifically, first acting area 350b1 reflects the light reflected from reflecting mirror 360 toward the plurality of lens mirror portions 337a, and reflects the light reflected from reflecting mirror 370 toward the plurality of lens mirror portions 337b.

Lens mirror array 336B reflects the light reflected from first acting area 350b1 toward second acting area 350b2. Specifically, the plurality of lens mirror portions 337a reflect the light reflected from first acting area 350b1 toward second acting area 350b2, and the plurality of lens mirror portions 337b reflect the light reflected from first acting area 350b1 toward second acting area 350b2.

Second acting area 350b2 is provided so as to traverse each of light reflected from the plurality of lens mirror portions 337a and the plurality of lens mirror portions 337b. Thus, second acting area 350b2 reflects the tight reflected from the plurality of lens mirror portions 337a and the plurality of lens mirror portions 337b toward the plurality of light receiving elements 41.

In a case thus configured also, the above-described cross sectional shape of downstream reflecting surface 350b of reflecting mirror 350 disposed downstream of lens mirror array 332B functioning as a splitting component, that has the same shape along a direction corresponding to the main direction, can cause a common optical effect, or reflection, on each of light split by lens mirror array 332B.

Thus image reading apparatus 10B according to the third embodiment can also provide an effect substantially equivalent to that of image reading apparatus 10 of the first embodiment.

In addition, when using the opposite surfaces of reflecting mirror 350 as reflecting surfaces is compared with using only one surface of reflecting mirror 350 as a reflecting surface, the former can reduce the number of reflecting mirrors more than the latter.

Furthermore, providing downstream reflecting surface 350b with first acting area 350b1 and second acting area 350b2 to allow downstream reflecting surface 350b to provide reflection twice allows a reduced number of reflecting mirrors to be used.

Fourth Embodiment

Figure 8:
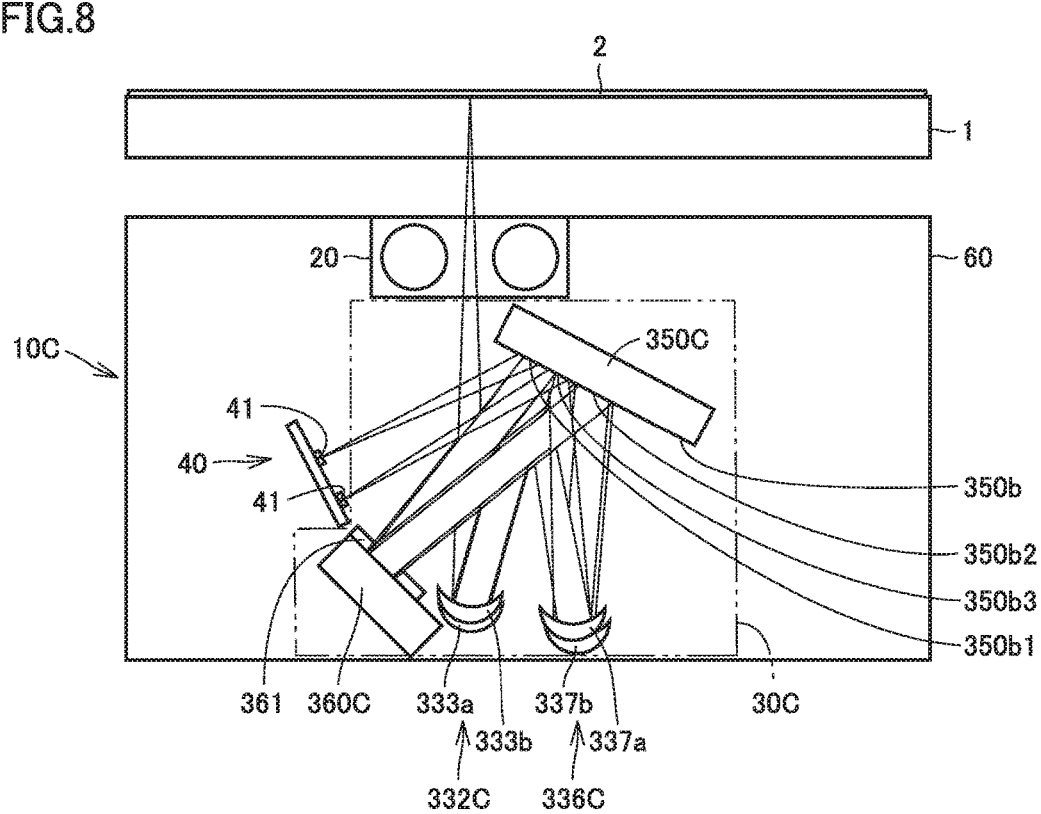
FIG. 8 is a schematic cross-sectional view of an image reading apparatus according to a fourth embodiment.

FIG. 8 is a schematic cross-sectional view of an image reading apparatus according to a fourth embodiment. With reference to FIG. 8, an image reading apparatus 10C according to the fourth embodiment will be described.

As shown in FIG. 8, image reading apparatus 10C according to the fourth embodiment is different from image reading apparatus 10 according to the first embodiment in how an optical system 30C is configured. The remainder in configuration is substantially the same.

Optical system 30C is configured such that the light reflected from original 2 is split by a lens mirror array 332C serving as a splitting component and is subsequently incident on a reflecting mirror 3500 serving as a downstream reflecting mirror. Furthermore, optical system 30C is configured to use a downstream reflecting surface 350b of reflecting mirror 350C three times to introduce the light reflected from original 2 to the plurality of light receiving elements 41.

Optical system 30C includes reflecting mirrors 3500 and 360C, lens mirror array 332C, and a lens mirror array 336C.

Reflecting mirror 350C corresponds to a common reflecting mirror. Reflecting mirror 350C has downstream reflecting surface 350b. Downstream reflecting surface 350b is located downstream of lens mirror array 332C serving as a splitting component on the optical path on which the light reflected from original 2 travels toward light receiving unit 40.

Downstream reflecting surface 350b is formed flat. Downstream reflecting surface 350b has a cross sectional shape having the same shape along the main direction. Downstream reflecting surface 350b functions as an optically acting area causing a common effect on each of light split by lens mirror array 332C.

Reflecting mirror 350C has first acting area 350b1, second acting area 350b2, and a third acting area 350b3. First acting area 350b1, second acting area 350b2, and third acting area 350b3 are provided on downstream reflecting surface 350b. First acting area 350b1, second acting area 350b2, and third acting area 350b3 are disposed sequentially on the optical path on which the light reflected from original 2 travels toward light receiving unit 40.

First acting area 350b1 is located upstream of second acting area 350b2 on the optical path. Second acting area 350b2 is located upstream of third acting area 350b3 on the optical path. First acting area 350b1, second acting area 350*b*2, and third acting area 350*b*3 area portion of downstream reflecting surface 350*b*, and function as an optically acting area.

Lens mirror array 332C includes a plurality of lens mirror portions 333*a*, 333*b* aligned along a direction corresponding to the main direction. A plurality of lens mirror portions 333*a* and a plurality of lens mirror portions 333*b* are disposed side by side alternately along a direction corresponding to the main direction. The plurality of lens mirror portions 333*a*, 333*b* reflect incident light while reducing it. Light incident on lens mirror array 332C is thus split along a direction corresponding to the main direction.

Furthermore, an elevation angle of a curved reflecting surface of lens mirror portion 333*a* differs from an elevation angle of a curved reflecting surface of lens mirror portion 333*b* in a direction corresponding to the sub direction. As a result, light incident on lens mirror array 332C is distributed in a direction corresponding to the sub direction.

Thus lens mirror array 332C functions as a splitting component splitting the light reflected from original 2 in a direction corresponding to the main direction, and also functions as a light distributing component distributing the light reflected from original 2 in a direction corresponding to the sub direction.

Lens mirror array 336C also includes a plurality of lens mirror portions 337*a*, 337*b* aligned along a direction corresponding to the main direction, and is substantially similar in configuration to lens mirror artily 332C. Thus, each of light split by first lens mirror array 332C along a direction corresponding to the main direction and distributed by first lens mirror array 332C in a direction corresponding to the sub direction can be reflected while being reduced in diameter.

Lens mirror array 332C and lens mirror array 336C are positioned to be close to each other in the sub direction. This allows lens mirror array 332C and lens mirror array 336C to be integrated together. When lens mirror array 332C and lens mirror array 336C are integrated together they can be formed as a single component. Further, in the production, each lens mirror's reflecting surface can be formed by performing vapor deposition once.

Reflecting mirror 360C narrows light split by lens mirror array 332C. Reflecting mirror 360C is provided with shielding portion 361 having an opening for example. Shielding portion 361 may be a sealed light shielding member. Reflecting mirror 360C may be a light absorbing member having a reflecting surface formed only on a necessary region thereof.

Reflecting mirror 360C has a reflecting surface having a cross sectional shape orthogonal to the main direction, that has the same shape along the main direction. The reflecting surface of reflecting mirror 360C functions as an optically acting area causing a common effect on each of light split by lens mirror array 332C.

In optical system 30C according to the fourth embodiment, the light reflected from original 2 is incident on lens mirror array 332C directly, and is split by lens mirror array 332C in a direction corresponding to the main direction and is also distributed by lens mirror array 332C in a direction corresponding to the sub direction.

Specifically, a portion of the light reflected from original 2 is reflected by the plurality of lens mirror portions 333*a* toward first acting area 350*b*1 of reflecting mirror 350C. Another portion of the light reflected from original 2 is reflected by the plurality of lens mirror portions 333*b* toward first acting area 350*b*1 of reflecting mirror 350C.

First acting area 350*b*1 is provided so as to traverse each of light split and distributed by lens mirror array 332C. Thus first acting area 350*b*1 reflects each of light split and distributed by lens mirror array 332C toward reflecting mirror 360C as a common effect.

The light incident on reflecting mirror 3600 is narrowed by shielding portion 361 and thus reflected toward second acting area 350*b*2 of reflecting mirror 350C. The reflecting surface of reflecting mirror 360C reflects each of light split and distributed by lens mirror array 332C toward second acting area 350*b*2 as a common effect.

Second acting area 350*b*2 is provided so as to traverse each of light reflected from reflecting mirror 360C. Thus second acting area 350*b*2 reflects each of tight split and distributed by lens mirror array 332C toward lens mirror array 336C as a common effect.

Specifically, second acting area 350*b*2 reflects the light reflected from the plurality of lens mirror portions 333*a* toward the plurality of lens mirror portions 337*a*, and reflects the light reflected from the plurality of lens mirror portions 333*b* toward the plurality of lens mirror portions 337*b*.

Lens mirror array 336C reflects the light reflected from second acting area 350*b*2 toward third acting area 350*b*3. Specifically, the plurality of lens mirror portions 337*a* reflect the light reflected from second acting area 350*b*2 toward third acting area 350*b*3, and the plurality of lens mirror portions 337*b* reflect the light reflected from second acting area 350*b*2 toward third acting area 350*b*3.

Third acting area 350*b*3 is provided so as to traverse each of light reflected from the plurality of lens mirror portions 337*a* and the plurality of lens mirror portions 337*b*. Thus, third acting area 350*b*3 reflects the light reflected from the plurality of lens mirror portions 337*a* and the plurality of lens mirror portions 337*b* toward the plurality of light receiving elements 41.

In a case thus configured also, the above-described cross sectional shapes of downstream reflecting surface 350*b* of reflecting mirror 350 and reflecting mirror 360C, respectively, disposed downstream of lens mirror array 332C functioning as a splitting component, that each have the same shape along a direction corresponding to the main direction, can cause a common optical effect, or reflection, on each of light split by lens mirror array 332O.

Thus image reading apparatus 10C according to the fourth embodiment can also provide an effect substantially equivalent to that of image reading apparatus 10 of the first embodiment.

Furthermore, providing downstream reflecting surface 350*b* with first acting area 350*b*1, second acting area 350*b*2 and third acting area 350*b*3 to allow downstream reflecting surface 350*b* to provide reflection three times allows a reduced number of reflecting mirrors to be used.

Fifth Embodiment

Figure 9:
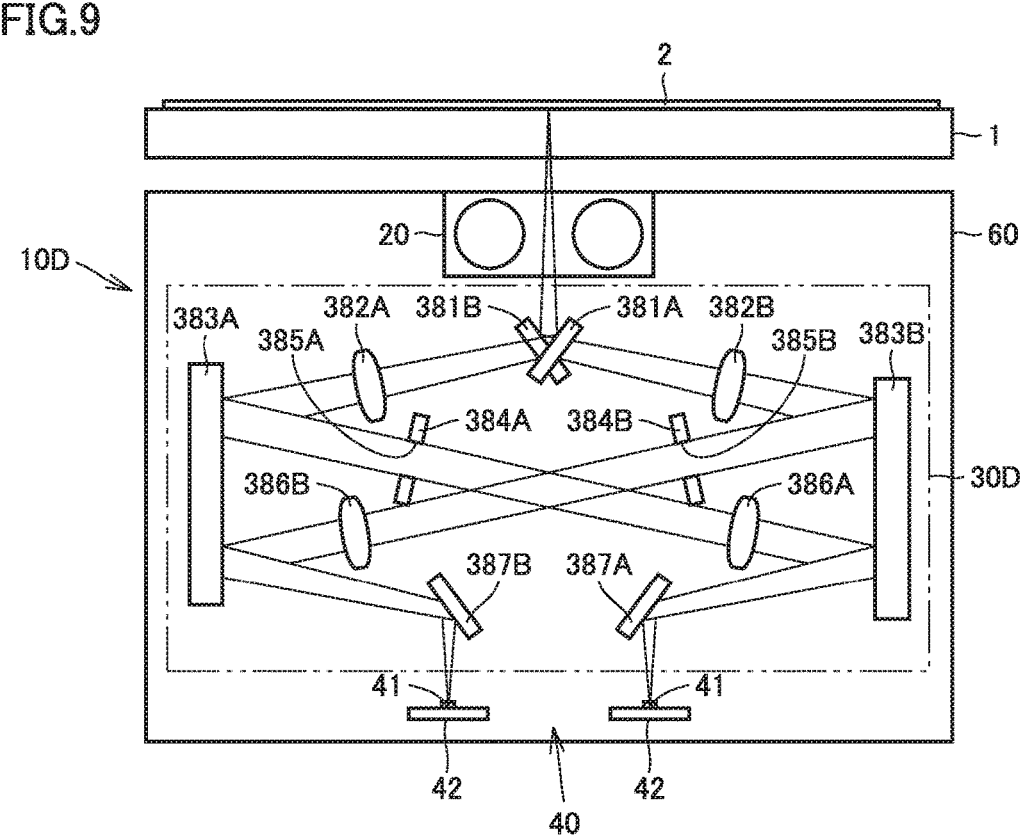
FIG. 9 is a schematic cross-sectional view of an image reading apparatus according to a fifth embodiment.

FIG. 9 is a schematic cross-sectional view of an image reading apparatus according to a fifth embodiment. With reference to FIG. 9, an image reading apparatus 10D according to the fifth embodiment will be described.

As shown in FIG. 9, image reading apparatus 10D according to the fifth embodiment is different from image reading apparatus 10 according to the first embodiment in how an optical system 30D is configured. The remainder in configuration is substantially the same.

Optical system 30D includes reflecting mirrors 381A, 381B, 383A, 383B, 387A and 387B, diaphragms 384A and 384B, and transmission lenses 382A, 382B, 386A and 386B.

Reflecting mirrors 381A, 381B are disposed side by side alternately along a direction corresponding to the main direction. Reflecting mirrors 381A, 381B have reflecting surfaces, respectively, facing away from each other. Reflecting mirrors 381A, 381B correspond to a splitting component splitting the light reflected from original 2 in a direction corresponding to the main direction.

Reflecting mirrors 383A, 383B have reflecting surfaces, respectively, facing each other. Between reflecting mirrors 383A and 383B, reflecting mirrors 381A, 381B, 387A and 387B, diaphragms 384A and 384B, and transmission lenses 382A, 382B, 386A and 386B are disposed.

Reflecting mirrors 383A and 383B are disposed downstream of reflecting mirrors 381A and 381B on the optical path on which the light reflected from original 2 travels toward light receiving unit 40. The reflecting surfaces of reflecting mirrors 383A and 383B correspond to a common portion disposed downstream of reflecting mirrors 381A and 381B serving as a splitting component on the optical path, and function as an optically acting area causing a common effect on each of light split by reflecting mirrors 381A and 381B. Reflecting mirrors 383A and 383B have their reflecting surfaces formed flat. The reflecting surfaces respectively of reflecting mirrors 383A and 383B each have a cross sectional shape orthogonal to a direction corresponding to the main direction, that has the same shape alone the direction corresponding to the main direction.

The light reflected from original 2 is split by reflecting mirrors 381A and 381B in a direction corresponding to the main direction.

The light reflected by reflecting mirror 381A is transmitted through transmission lens 382A and reflected by reflecting mirror 383A toward reflecting mirror 383B. The light reflected toward reflecting mirror 383B passes through an aperture 385A provided through diaphragm 384A and is transmitted through transmission lens 386A, and subsequently incident on reflecting mirror 383B. The light incident on reflecting mirror 383B is reflected toward reflecting mirror 387A and reflected by reflecting mirror 387A toward light receiving element 41.

The light reflected by reflecting mirror 381B is transmitted through transmission lens 382B and reflected by reflecting mirror 383B toward reflecting mirror 383A. The light reflected toward reflecting mirror 383A passes through an aperture 385B provided through diaphragm 384B and is transmitted through transmission lens 386B, and subsequently incident on reflecting mirror 383A. The light incident on reflecting mirror 383A is reflected toward reflecting mirror 387B and reflected by reflecting mirror 387B toward light receiving element 41.

In a case thus configured also, reflecting mirrors 383A, 383B disposed downstream of reflecting mirrors 381A and 381B functioning as a splitting component, extend in a direction corresponding to the sub direction across each of light split by reflecting mirrors 381A and 381B. Furthermore, the reflecting surfaces respectively of reflecting mirrors 383A and 383B each have a cross sectional shape that has the same shape along a direction corresponding to the main direction.

The reflecting surfaces of reflecting mirrors 383A and 383B can thus cause a common optical effect, or reflection, on each of light split by reflecting mirrors 381A and 381B.

When the fifth embodiment is compared with reflecting mirrors 383A and 383B divided in an upward and downward direction so that the light split by reflecting mirrors 381A and 381B is reflected by independent reflecting mirrors, respectively, the former can suppress an increase in the number of optical components composing optical system 30D.

Suppressing a increase in the number of optical components, as compared with providing a plurality of reflecting mirrors so as to correspond to each split light for adjustment, can suppress variation in angle for installation and the like and as a result can also improve imaging performance.

First Exemplary Variation

Figure 10:
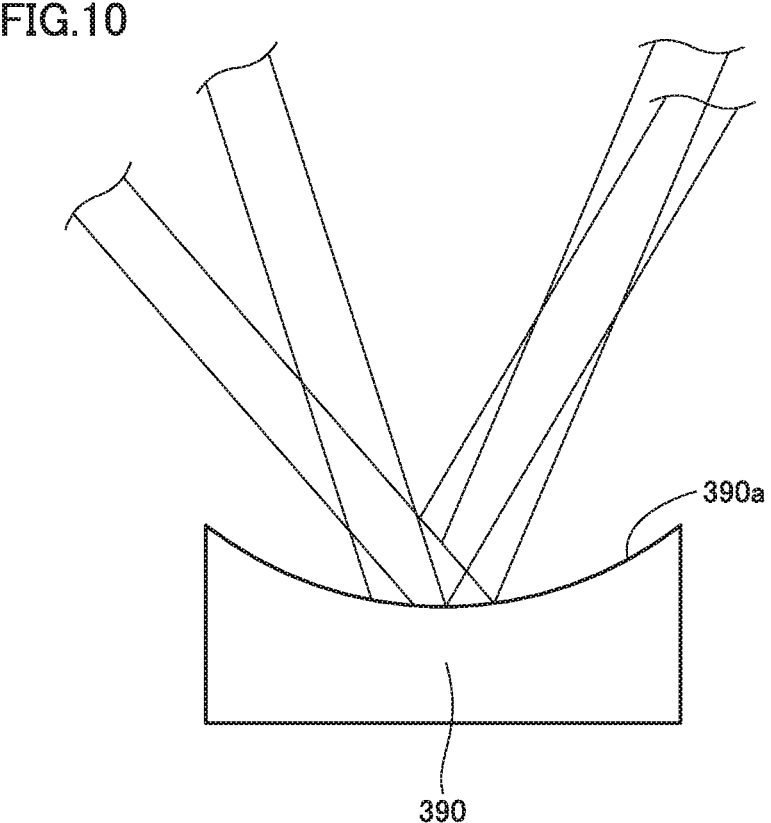
FIG. 10 is a schematic cross-sectional view of a lens mirror according to a first exemplary variation.

FIG. 10 is a schematic cross-sectional view of a lens mirror according to a first exemplary variation. A lens mirror 390 will be described with reference to FIG. 10.

As shown in FIG. 10, lens mirror 390 according to the first exemplary variation is configured to have power in a direction corresponding to the sub direction. Specifically, lens mirror 390 has a curved reflecting surface 390a having a cross-sectional shape orthogonal to a direction corresponding to the main direction, which has the same shape along the main direction. In this case, lens mirror 390 corresponds to a light distributing component distributing the light reflected from original 2 in a direction corresponding to the sub direction.

When lens mirror 390 according to the first exemplary variation is applied to the first embodiment in place of second lens mirror array 336 according to the first embodiment, it can cause a common effect, i.e., distributing light in a direction corresponding to the sub direction, on each of light split by first lens mirror array 332 in the main direction. Thus, curved reflecting surface 390a of lens mirror 390 also corresponds to an optically acting area.

When such a lens mirror 390 is used, it is unnecessary to form a plurality of lens mirror portions, and as a single curved reflecting surface 390a is provided, variation in precision can be suppressed.

Second Exemplary Variation

Figure 11:
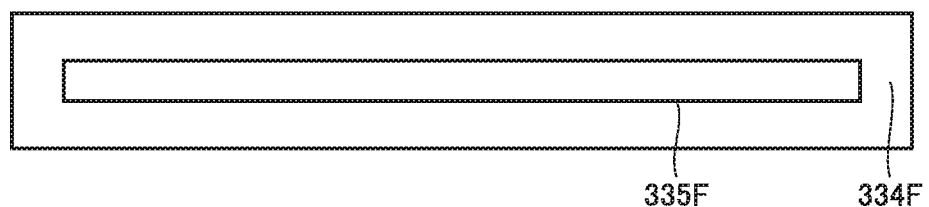
FIG. 11 is a front view of a diaphragm according to a second exemplary variation.

FIG. 11 is a front view of a diaphragm according to a second exemplary variation. With reference to FIG. 11, a diaphragm 334F according to the second exemplary variation will be described.

As shown in FIG. 11, when diagram 334F according to the second exemplary variation is compared with diagram 334 according to the first embodiment, the former is different from the latter in that an aperture 335F is continuously formed along a direction corresponding to the main direction.

A cross sectional shape of aperture 335F orthogonal to a direction corresponding to the main direction is the same shape along the direction corresponding to the main direction. When diaphragm 334F according to the second exemplary variation is applied to the first embodiment, it can cause a common effect, i.e., narrowing light in a direction corresponding to the sub direction, on each of light split by first lens mirror array 332 in the main direction. Thus the aperture plane of aperture 335F also corresponds to an optically acting area.

When diaphragm 334F adopted in each embodiment is compared with an aperture provided at a position corresponding to each split light, the former can have a simplified configuration.

The information reading apparatus based on the present disclosure described above comprises: a light source that emits light in a main direction toward an object to be read; a light receiving unit that receives light reflected from the object to be read, and an optical system that allows the light receiving unit to receive the light reflected from the object to be read. The light receiving unit includes a plurality of light receiving elements disposed such that a plurality thereof are aligned with a plurality thereof along a direction corresponding to the main direction and a plurality thereof are aligned with a plurality thereof along a direction corresponding to a sub direction orthogonal to the main direction. The optical system includes a plurality of optical components for guiding the light reflected from the object to be read to each of the plurality of light receiving elements. The plurality of optical components include a splitting component that splits the light reflected from the object to be read in a direction corresponding to the main direction, and a common component provided with a common portion disposed downstream of the splitting component on an optical path on which the light reflected from the object to be read travels toward the light receiving unit. The common portion has an optically acting area causing a common effect on each of light split by the splitting component, and a cross sectional shape of the optically acting area orthogonal to a direction corresponding to the main direction is the same shape along the direction corresponding to the main direction.

In the image reading apparatus according to the present disclosure, the plurality of light receiving elements may be disposed in the sub direction in two rows in a staggering manner.

In the image reading apparatus according to the present disclosure, preferably the splitting component is a lens mirror array having a plurality of lens mirror portions aligned along a direction corresponding to the main direction.

In the image reading apparatus according to the present disclosure, the plurality of optical components may include an upstream reflecting mirror disposed upstream of the splitting component on an optical path on which the light reflected from the object to be read travels toward the light receiving unit. In that case, preferably the optical system is configured such that the light reflected from the object to be read is reflected by the upstream reflecting mirror and thereafter incident on the splitting component.

In the image reading apparatus according to the present disclosure, the plurality of optical components may include a downstream reflecting mirror disposed downstream of the splitting component on an optical path on which the light reflected from the object to be read travels toward the light receiving unit. In that case, preferably the optical system may be configured such that the light reflected from the object to be read is split by the splitting component and thereafter incident on the downstream reflecting mirror.

In the image reading apparatus according to the present disclosure, the plurality of optical components may include a first downstream reflecting mirror disposed subsequent to the splitting component along an optical path on which the light reflected from the object to be read travels toward the light receiving unit. In that case, preferably the plurality of lens mirror portions each have a reflecting, surface facing a side on which the first downstream reflecting mirror is located.

In the image reading apparatus according to the present disclosure, preferably the common component is a common reflecting mirror. In that case, preferably the common reflecting mirror has a downstream reflecting surface disposed downstream of the splitting component on an optical path on which the light reflected front the object to be read travels toward the light receiving unit. Furthermore, preferably the optically acting area is composed of the downstream reflecting surface.

In the image reading apparatus according to the present disclosure, the optically acting area may have a first acting area and a second acting area sequentially disposed on an optical path on which the light reflected from the object to be read travels toward the light receiving unit. The first acting area and the second acting area may be provided on the downstream reflecting surface.

In the image reading apparatus according to the present disclosure, the common reflecting mirror may have an upstream reflecting surface disposed upstream of the splitting component on an optical path on which the light reflected from the object to be read travels toward the light receiving unit. In that case, preferably the upstream reflecting surface and the downstream reflecting surface are opposite to each other. Furthermore, preferably the optical system is configured such that the light reflected from the object to be read is reflected by the upstream reflecting surface and thereafter incident on the downstream reflecting surface.

In the image reading apparatus according to tire present disclosure, the plurality of optical components may include a reflecting mirror that is disposed downstream of the splitting component on an optical path on which the light reflected from the object to be read travels toward the light receiving unit, and narrows light split by the splitting component.

In the image reading apparatus according to the present disclosure, preferably the plurality of optical components include a light distributing component that distributes the light reflected front the object to be read in a direction corresponding to the sub direction. The light distributing component may immediately precedes the light receiving unit on an optical path on which the light reflected from the object to be read travels toward the light receiving unit.

In the image reading apparatus according to the present disclosure, the plurality of optical components may include a first reflecting mirror and a second reflecting mirror, a first lens mirror array and a second lens mirror array each having a plurality of lens mirror portions aligned along a direction corresponding to the main direction, and a diaphragm that narrows the light reflected from the object to be read. In that case, preferably the splitting component is the first lens mirror array, and preferably the first reflecting mirror reflects light reflected from the first lens mirror array toward the second reflecting mirror and the second reflecting mirror reflects light reflected by the first reflecting mirror toward the second lens mirror array. Furthermore, preferably the diaphragm is disposed between the first reflecting mirror and the second reflecting mirror on an optical path on which the light reflected from the object to be read travels toward the light receiving unit.

In the image reading apparatus according to the present disclosure, preferably the first lens mirror array, the second lens mirror array, and the diaphragm are integrated together.

In the image reading apparatus according to the present disclosure, preferably the plurality of light receiving elements are flush with one another.

In the image reading apparatus according to the present disclosure, preferably the plurality of light receiving its are located on the same side with respect to the object to be read.

In the image reading apparatus according to the present disclosure, preferably the optical system distributes the light reflected from the object to be read in a plurality of rows in a direction corresponding to the sub direction and preferably the plurality of distributed rows of light have mutually different optical path lengths.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus comprising:
a light source that emits light in a main direction toward an object to be read;
a light receiving unit that receives light reflected from the object to be read; and
an optical system that allows the light receiving unit to receive the light reflected from the object to be read,
the light receiving unit including a plurality of light receiving elements disposed such that a plurality thereof are aligned with a plurality thereof along a direction corresponding to the main direction and a plurality thereof are aligned with a plurality thereof along a direction corresponding to a sub direction orthogonal to the main direction,
the optical system including a plurality of optical components for guiding the light reflected from the object to be read to each of the plurality of light receiving elements,
the plurality of optical components including a splitting component that splits the light reflected from the object to be read in a direction corresponding to the main direction, and a common component provided with a common portion disposed downstream of the splitting component on an optical path on which the light reflected from the object to be read travels toward the light receiving unit,
the common portion having an optically acting area causing a common effect on each of light split by the splitting component,
a cross sectional shape of the optically acting area orthogonal to a direction corresponding to the main direction being a same shape along the direction corresponding to the main direction.

2. The image reading apparatus according to claim 1, wherein
the plurality of light receiving elements are disposed in two rows in a direction corresponding to the sub direction, and
the light receiving elements disposed in a first row in a direction corresponding to the sub direction and the light receiving elements disposed in a second row in a direction corresponding to the sub direction are alternately disposed in a direction corresponding to the main direction.

3. The image reading apparatus according to claim 1, wherein the splitting component is a lens mirror array having a plurality of lens mirror portions aligned along a direction corresponding to the main direction.

4. The image reading apparatus according to claim 3, wherein
the plurality of optical components include an upstream reflecting mirror disposed upstream of the splitting component on an optical path on which the light reflected from the object to be read travels toward the light receiving unit, and the optical system is configured such that the light reflected from the object to be read is reflected by the upstream reflecting mirror and thereafter incident on the splitting component.

5. The image reading apparatus according to claim 3, wherein
the plurality of optical components include a downstream reflecting mirror disposed downstream of the splitting component on an optical path on which the light reflected from the object to be read travels toward the light receiving unit, and
the optical system is configured such that the light reflected from the object to be read is split by the splitting component and thereafter incident on the downstream reflecting mirror.

6. The image reading apparatus according to claim 3, wherein
the plurality of optical components include a first downstream reflecting mirror disposed subsequent to the splitting component along an optical path on which the light reflected from the object to be read travels toward the light receiving unit, and
the plurality of lens mirror portions each have a reflecting surface facing a side on which the first downstream reflecting mirror is located.

7. The image reading apparatus according to claim 1, wherein
the common component is a common reflecting mirror,
the common reflecting mirror has a downstream reflecting surface disposed downstream of the splitting component on an optical path on which the light reflected from the object to be read travels toward the light receiving unit, and
the optically acting area is composed of the downstream reflecting surface.

8. The image reading apparatus according to claim 7, wherein
the optically acting area has a first acting area and a second acting area sequentially disposed on an optical path on which the light reflected from the object to be read travels toward the light receiving unit, and
the first acting area and the second acting area are provided on the downstream reflecting surface.

9. The image reading apparatus according to claim 8, wherein
the common reflecting mirror has an upstream reflecting surface disposed upstream of the splitting component on an optical path on which the light reflected from the object to be read travels toward the light receiving unit,
the upstream reflecting surface and the downstream reflecting surface are opposite to each other, and
the optical system is configured such that the light reflected from die object to be read is reflected by the upstream reflecting surface and thereafter incident on the downstream reflecting surface.

10. The image reading apparatus according to claim 7, wherein the plurality of optical components include a reflecting mirror that is disposed downstream of the splitting component on an optical path on which the light reflected from the object to be read travels toward the light receiving unit, and narrows light split by the splitting component.

11. The image reading apparatus according to claim 1, wherein
the plurality of optical components include a light distributing component that distributes the light reflected from the object to be read in a direction corresponding to the sub direction, and the light distributing component immediately precedes the light receiving unit on an optical path on which the light reflected from the object to be read travels toward the light receiving unit.

12. The image reading apparatus according to claim 1, wherein
the plurality of optical components include a first reflecting mirror and a second reflecting mirror, a first lens mirror array and a second lens mirror array each having a plurality of lens mirror portions aligned along a direction corresponding to the main direction, and a diaphragm that narrows the light reflected from the object to be read,
the splitting component is the first lens mirror array,
the first reflecting mirror reflects light reflected from the first lens mirror array toward the second reflecting mirror,
the second reflecting mirror reflects light reflected by the first reflecting mirror toward the second lens mirror array, and the diaphragm is disposed between the first reflecting mirror and the second reflecting mirror on an optical path on which the fight reflected from the object to be read travels toward the light receiving unit.

13. The image reading apparatus according to claim 12, wherein the first lens mirror array, the second lens mirror array, and the diaphragm are integrated together.

14. The image reading apparatus according to claim 13, wherein the plurality of light receiving elements are located on a same side with respect to the object to be read.

15. The image reading apparatus according to claim 1, wherein the plurality of light receiving elements are flush with one another.

16. The image reading apparatus according to claim 1, wherein the optical system is configured such that the light reflected from the object to be read is distributed in a plurality of rows in a direction corresponding to the sub direction and the plurality of distributed rows of light have mutually different optical path lengths.

* * * * *